(12) United States Patent
Fukui

(10) Patent No.: US 7,378,474 B2
(45) Date of Patent: May 27, 2008

(54) OLEFIN POLYMERIZATION CATALYST

(75) Inventor: Yoshifumi Fukui, Toyonaka (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 10/589,249

(22) PCT Filed: Feb. 14, 2005

(86) PCT No.: PCT/JP2005/002115

§ 371 (c)(1),
(2), (4) Date: Aug. 14, 2006

(87) PCT Pub. No.: WO2005/080445

PCT Pub. Date: Sep. 1, 2005

(65) Prior Publication Data

US 2007/0167316 A1 Jul. 19, 2007

(30) Foreign Application Priority Data

Feb. 23, 2004 (JP) ............................. 2004-045591
Mar. 24, 2004 (JP) ............................. 2004-086268

(51) Int. Cl.
C08F 4/80 (2006.01)
B01J 31/22 (2006.01)
(52) U.S. Cl. ..................... 526/172; 502/162
(58) Field of Classification Search ............... 526/172; 502/155, 162
See application file for complete search history.

(56) References Cited

U.S. PATENT DOCUMENTS 6,559,326 B1 * 5/2003 Kristen et al. ................ 556/21

FOREIGN PATENT DOCUMENTS

DE      2923206 A1    12/1980
WO      WO 02/024763 A1    3/2002

OTHER PUBLICATIONS

Joachim Heinicke, et al, "2-Phosphanylphenolate Nickel Catalysts for the Polymerization of Ethylene", Chemistry-A European Journal, vol. 9, No. 24, 2003, pp. 6093-6107.
Wilhelm Keim, et al, "Reactions of Chelate Ylides With Nickel (0) Complexes", Organometallics, vol. 5, No. 11, 1986, pp. 2356-2359.
Bauers, et al., "Catalytic Polymerization of Ethylene in Aqueous Emulsion with a Simple in Situ Catalyst," Macromolecules 36:6711-6715 (2003).
Soula, et al., "Very Active Neutral P,O-Chelated Nickel Catalysts for Ethylene Polymerization," Macromolecules 34:2438-2442 (2001).
Soula, et al., "Catalytic Polymerization of Ethylene in Emulsion," Macromolecules 34:2022-2026 (2001).

* cited by examiner

*Primary Examiner*—Caixia Lu
(74) *Attorney, Agent, or Firm*—Sughrue Mion, PLLC

(57) ABSTRACT

The present invention provides an olefin polymerization catalyst composed of a late transition metal complex exhibiting high olefin polymerization activity and also provides a method for producing the same. Furthermore, the present invention provides an olefin polymer prepared using the catalyst and a method for producing the olefin polymer. The olefin polymerization catalyst is composed of a fluorine-containing late transition metal complex having a structure represented by a specified general formula. The polymerization catalyst can be prepared in the reaction system.

9 Claims, No Drawings

OLEFIN POLYMERIZATION CATALYST

TECHNICAL FIELD

The present invention relates to a novel olefin polymerization catalyst, olefin polymers prepared using the catalyst, and methods for producing the catalyst and polymers.

BACKGROUND ART

At present, highly activation of olefin polymerization catalysts is the most important problem. Since copolymerization with polar monomers and aqueous-system polymerization have recently been made possible, olefin polymerization catalysts composed of late transition metal complexes have attracted attention.

In particular, it has been reported that nickel catalysts (Shell Higher Olefin Process catalyst: SHOP catalyst) having a fluorohydrocarbon group near an oxygen atom and an ester group near a phosphorus atom exhibit high ethylene polymerization activity even in an aqueous system (Patent Document 1 and Non-patent Documents 1 and 2).

It has also been reported that chlorine-containing nickel catalysts (Shell Higher Olefin Process catalyst: SHOP catalyst) represented by general formula (5) or (6) exhibit high ethylene polymerization activity even in an aqueous system (Patent Document 2 and Non-patent Document 3).

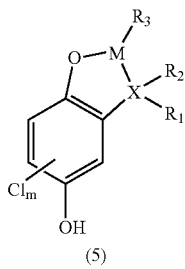

[Chem. 5]

(5)

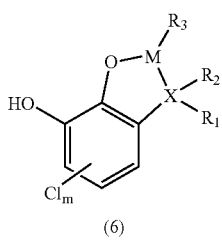

[Chem. 6]

(6)

(wherein Ph represents a phenyl group).

However, the activity and molecular weights of the resulting polymers are unsatisfactory for practical use, and development of new catalysts has been demanded.

[Patent Document 1] WO02/24763

[Patent Document 2] DE2923206A1

[Non-patent Document 1] Macromolecules, 2001, vol. 34, p. 2438

[Non-patent Document 2] Macromolecules, 2001, vol. 34, p. 2022

[Non-patent Document 3] Macromolecules, 2003, vol. 36, p. 6711

DISCLOSURE OF THE INVENTION

Problem to be Solved by the Invention

An object of the present invention is to provide an olefin polymerization catalyst with high activity capable of producing high-molecular-weight polymers.

Means for Solving the Problem

As a result of intensive research for resolving the above-descried problem, the inventors have achieved the present invention.

The present invention relates to an olefin polymerization catalyst represented by general formula (1), (2), or (3):

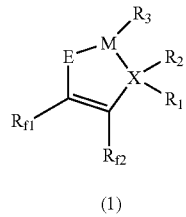

[Chem. 7]

(1)

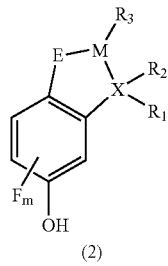

[Chem. 8]

(2)

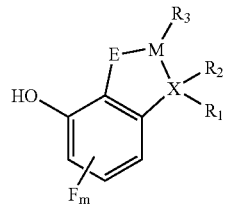

[Chem. 9]

(3)

(wherein M is nickel, palladium, or platinum; E is oxygen or sulfur; X is phosphorus, arsenic, or antimony; $R_1$, $R_2$, and $R_3$ are each independently hydrogen or a hydrocarbon group having 1 to 20 carbon atoms; $R_{f1}$ and $R_{f2}$ are each independently a fluorine atom or a fluorohydrocarbon group having 1 to 20 carbon atoms; F is fluorine; and m is 1 to 3).

In a preferred embodiment, the present invention relates to the olefin polymerization catalyst wherein M is nickel.

In another preferred embodiment, the present invention relates to the olefin polymerization catalyst wherein E is oxygen, and X is phosphorus.

In a further preferred embodiment, the present invention relates to the olefin polymerization catalyst wherein $R_{f1}$ and $R_{f2}$ are each a fluorohydrocarbon group having 1 to 20 carbon atoms.

In a still further preferred embodiment, the present invention relates to the olefin polymerization catalyst wherein $R_{f1}$ is a trifluoromethyl group, and $R_{f2}$ is a pentafluorophenyl group.

In a further preferred embodiment, the present invention relates to the olefin polymerization catalyst wherein $R_1$, $R_2$, and $R_3$ are each a phenyl group.

In a further preferred embodiment, the present invention relates to the olefin polymerization catalyst represented by general formula (4):

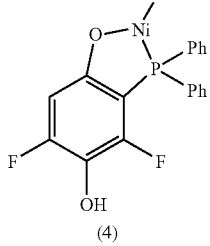

[Chem. 10]

(4)

(wherein Ph represents a phenyl group).

The present invention also relates to an olefin polymer prepared using the above-described olefin polymerization catalyst.

In a preferred embodiment, the present invention relates to the olefin polymer wherein an olefin monomer is an α-olefin having 10 or less carbon atoms.

The present invention further relates to a method for producing the olefin polymerization catalyst.

The present invention further relates to a method for producing the olefin polymer.

ADVANTAGE OF THE INVENTION

The olefin polymerization catalyst of the present invention exhibits high olefin polymerization activity and can produce high-molecular-weight olefin polymers.

BEST MODE FOR CARRYING OUT THE INVENTION

The present invention will be described in detail below.

(Olefin Polymerization Catalyst)

The present invention relates to an olefin polymerization catalyst represented by general formula (1), (2), or (3):

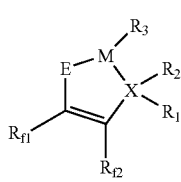

[Chem. 11]

(1)

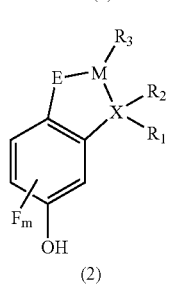

[Chem. 12]

(2)

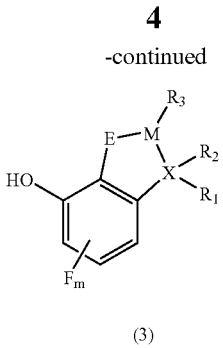

[Chem. 13]

(3)

(wherein M is nickel, palladium, or platinum; E is oxygen or sulfur; X is phosphorus, arsenic, or antimony; $R_1$, $R_2$, and $R_3$ are each independently hydrogen or a hydrocarbon group having 1 to 20 carbon atoms; $R_{f1}$ and $R_{f2}$ are each independently a fluorine atom or a fluorohydrocarbon group having 1 to 20 carbon atoms; F is fluorine; and m is 1 to 3).

The olefin polymerization catalyst used in the present invention is preferably prepared by any one of the following reactions:

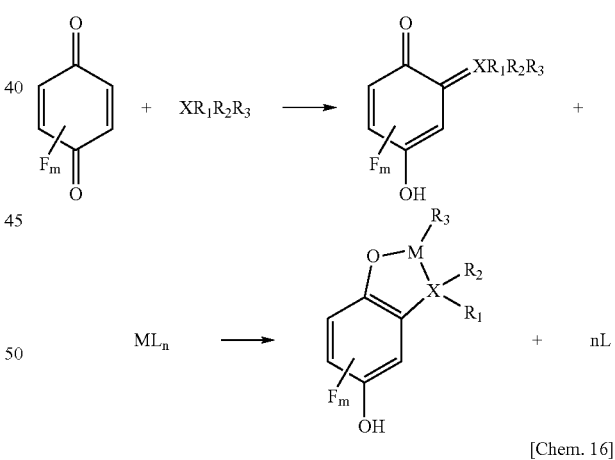

[Chem. 14]

[Chem. 15]

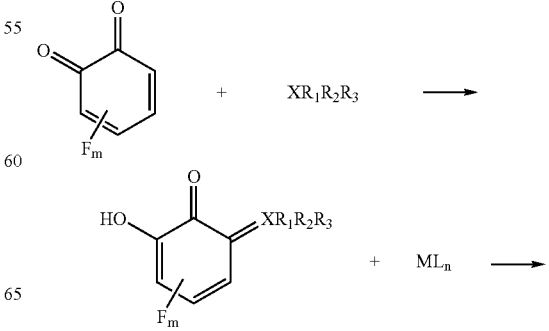

[Chem. 16]

-continued

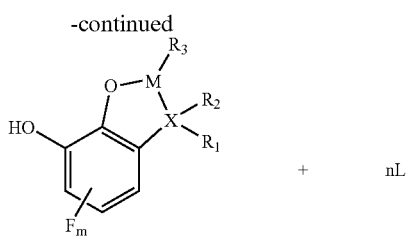 + nL (In the reaction formulae, M is zero-valent nickel, palladium, or platinum; $ML_n$, is a zero-valent nickel, palladium, or platinum compound; E is oxygen or sulfur; X is phosphorus, arsenic, or antimony; $R_1$, $R_2$, and $R_3$ are each independently hydrogen or a hydrocarbon group having 1 to 20 carbon atoms; $R_{f1}$ and $R_{f2}$ are each independently a fluorine atom or a fluorohydrocarbon group having 1 to 20 carbon atoms; F is fluorine; m is 1 to 3; L is not particularly limited as long as it coordinates to M and maintains the zero-valency of M; and n is a natural number).

From the viewpoint that these reactions readily proceed, M is preferably zero-valent nickel.

E is preferably oxygen, and X is preferably phosphorus. $ML_n$ is a zero-valent nickel, palladium, or platinum compound, and preferred examples of such a zero-valent nickel compound include bis(cyclooctadiene)nickel, bis(cyclooctatetraene)nickel, bis(1,3,7-octatriene)nickel, bis(allyl)nickel, bis(methallyl)nickel, and triethylene nickel. In particular, bis(cyclooctadiene)nickel is preferred.

$R_{f1}$ and $R_{f2}$ are each independently preferably a hydrocarbon group having 1 to 20 carbon atoms. Examples include a trifluoromethyl group, a pentafluoroethyl group, a heptafluoropropyl group, a pentafluorophenyl group, and a trifluoromethyl-substituted phenyl group. In particular, $R_{f1}$, is preferably a trifluoromethyl group, and $R_{f2}$ is preferably a pentafluorophenyl group.

Since the catalyst of the present invention contains fluorine in its skeleton, the catalyst can exhibit high activity and produce high-molecular-weight olefin polymers.

$R_1$, $R_2$, and $R_3$ are each independently preferably a hydrocarbon group having 1 to 20 carbon atoms, particularly a substituted aromatic group. The substituted aromatic group is most preferably a phenyl group. $R_1$, $R_2$, and $R_3$ may be independently the same as $R_{f1}$ or $R_{f2}$.

In order to accelerate the reaction, a phosphine, a phosphine oxide, a ketone, an ester, an ether, an alcohol, a nitrile, an amine, a pyridine, an olefin, or the like is preferably allowed to coexist. In particular, an olefin is preferably allowed to coexist.

The reaction temperature is 0° C. to 100° C. and preferably room temperature to 70° C. The reaction time is not particularly limited, but is preferably less than 1 hour, particularly less than 20 minutes.

The reaction is preferably performed in an inert atmosphere, such as argon, nitrogen, or the like. According to circumstances, trace amounts of oxygen and moisture may be present.

The reaction is usually preferably performed using a solvent, and an aliphatic or aromatic solvent is preferably used. The solvent may be halogenated.

Examples of the solvent include toluene, ethylbenzene, xylene, chlorobenzene, dichlorobenzene, butane, isobutane, pentane, hexane, heptane, octane, decane, isododecane, cyclohexane, cycloheptane, methylcyclohexane, methylcycloheptane, ethylcyclohexane, butyl chloride, methylene chloride, and chloroform.

The solvent may be a polar solvent such as tetrahydrofuran, dioxane, diethyl ether, acetone, ethanol, methanol, ethylene glycol, methyl ethyl ketone, methyl isobutyl ketone, ethyl acetate, or water. These solvents may be used in a mixture.

The solvent is generally preferably used at a concentration in a range of 1 to 20000 μmol/L and more preferably 10 to 10000 μmol/L in terms of M.

In the reaction, the molar ratio between the two compounds used for preparing a ligand is preferably 1.5/1 to 1/1.5 and more preferably 1.1/1 to 1/1.1.

In the reaction, at least an equivalent amount of $ML_n$ is preferably used for increasing the reaction yield, and thus the $ML_n$/ligand molar ratio is preferably 4/1 to 1/1 and more preferably 3/1 to 2/1.

The olefin polymerization catalyst of the present invention may be dinuclear.

Preferred examples of the olefin polymerization catalyst of the present invention include compounds represented by the following general formulae:

[Chem. 17]

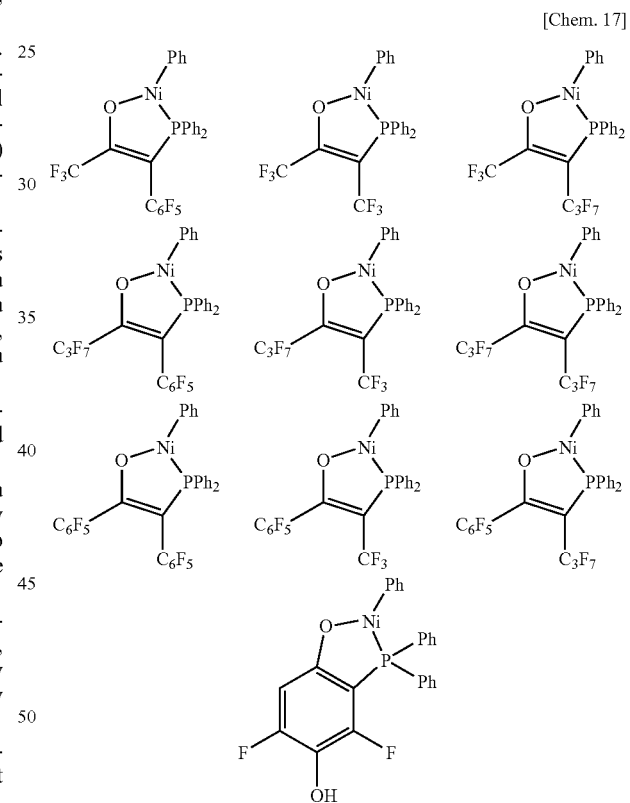

(wherein Ph represents a phenyl group).

(Olefin Monomer)

Preferred examples of the olefin monomer used in the present invention include, but are not limited to, olefins having 2 to 20 carbon atoms, such as ethylene, propylene, 1-butene, 1-hexene, 1-octene, 1-decene, 1-hexadecene, 1-eicosene, 4-methyl-1-pentene, 3-methyl-1-pentene, 3-methyl-1-butene, vinylcyclohexane, cyclopentene, cyclohexene, cyclooctene, norbornene, and 5-phenyl-2-norbornene.

Among these compounds, α-olefins having 10 or less carbon atoms are preferred from the viewpoint of high polymerization activity. Examples of such olefins include ethylene, propylene, 1-butene, 1-hexene, and 1-octene. These olefin monomers may be used alone or in combination of two or more.

Also, the monomer may be combined with a small amount of diene, such as 1,3-butadiene, isoprene, 1,4-hexadiene, 1,5-hexadiene, 1,5-cyclooctadiene, 1,9-decadiene, 1,13-tetradecadiene, norbornadiene, 5-viny-2-norbornene, ethylidene norbornene, dimethanooctahydronaphthalene, or dicylcopentadiene.

Furthermore, a compound of the formula $CH_2=CH(CH_2)_nG$ may be combined in a small amount. In the formula, n is 2 to 20, G is a hydroxyl group, a hydroxyl group-containing hydrocarbon group, an ether group, a fluorohydrocarbon group, an ester group, a carboxylic group, an alkoxysilyl group, or a silanol group.

The amount of the olefin monomer used is not limited, but the olefin monomer is preferably used at an olefin monomer/catalyst (central metal or ligand in a smaller amount) molar ratio of 10 to $10^9$, more preferably 100 to $10^7$, and most preferably 1000 to $10^5$. When the molar ratio is excessively low, only polymers with a lower molecular weight can be produced, while when the molar ratio is excessively high, the polymer yield relative to the monomer tends to decrease.

(Olefin Polymer)

Olefin polymerization may be performed using a solvent. The solvent is not particularly limited but is preferably an aliphatic or aromatic solvent. The solvent may be halogenated. Examples of the solvent include toluene, ethylbenzene, xylene, chlorobenzene, dichlorobenzene, butane, isobutane, pentane, hexane, heptane, octane, decane, isododecane, cyclohexane, cycloheptane, methylcyclohexane, methylcycloheptane, ethylcyclohexane, butyl chloride, methylene chloride, and chloroform. The solvent may be a polar solvent such as tetrahydrofuran, dioxane, diethyl ether, acetone, ethanol, methanol, ethylene glycol, methyl ethyl ketone, methyl isobutyl ketone, ethyl acetate, or water.

These solvents may be used alone or in combination of two or more. Therefore, vapor phase polymerization, bulk polymerization, solution polymerization, suspension polymerization, dispersion polymerization, emulsion polymerization, or emulsion and dispersion polymerization may be used.

The polymerization temperature is −30° C. to 200° C., preferably 0 to 100° C., and more preferably room temperature to 70° C. The polymerization time is not particularly limited but is generally 10 minutes to 100 hours, and the reaction pressure is not particularly limited but is atmospheric pressure to 10 MPa.

The polymerization is preferably performed in an inert atmosphere, such as argon, nitrogen, or the like. According to circumstances, trace amounts of oxygen and moisture may be present.

The polymerization may be conducted by any one of batch (discontinuous), semicontinuous, and continuous methods.

In the present invention, the polymerization includes not only homopolymerization and random copolymerization but also copolymerization such as block copolymerization and graft copolymerization. Therefore, polymers include homopolymers and copolymers (random, block, graft, and the like). Two or more of these polymers may be mixed.

EXAMPLES

Although the present invention will be described in further detail below with reference to examples, the present invention is not limited by these examples.

Synthesis Example 1

(Synthesis of Ligand)

According to J. Org. Chem. p. 5558, vol. 53(23), 1988, a ligand was synthesized as follows: In a nitrogen atmosphere, 2.617 g of pentafluorobenzyltriphenylphosphonium bromide (synthesized according to Helvetica Chimica Acta, p. 1928, vol. 76, 1993) and 11 ml of dry THF (manufactured by Wako Pure Chemical Industries, Ltd.) were charged and cooled to 0° C. using an ice bath. Then, 1.5 ml of triethylamine (manufactured by Wako Pure Chemical Industries, Ltd.) dried over molecular sieve was added to the mixture, followed by stirring for 15 minutes. Furthermore, 0.78 ml of trifluoroacetic anhydride (manufactured by Tokyo Chemical Industries Co., Ltd.) was added dropwise to the mixture, followed by reaction at 0° C. for 1 hour and at room temperature (15° C.) for 1 hour. The filtrate was concentrated, washed with 15 ml of distilled water (manufactured by Wako Pure Chemical Industries, Ltd.), and then dried. The resultant product was dissolved in methanol at 60° C. and gradually cooled to 0° C. to recrystallize the product. The yield after drying was 1.5 g. $^1$H-NMR (CDCl$_3$) showed the production of a compound represented by the chemical formula below because a benzyl proton peak disappeared.

[Chem. 18]

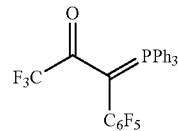

(wherein Ph represents a phenyl group).

Example 1

(Preparation of Olefin Polymerization Catalyst and Polymerization of 1-hexene)

In a nitrogen atmosphere, 10 ml of dry toluene (manufactured by Wako Pure Chemical Industries, Ltd.) and 10 ml of 1-hexene (manufactured by Wako Pure Chemical Industries, Ltd.) dried over molecular sieve were added to 14.8 mg (27.5 μmol) of the compound synthesized in Synthesis Example 1 and 15.1 mg (55 μmol) of bis(cyclooctadiene) nickel (manufactured by Kanto Chemical Co., Ltd.), followed by polymerization at 60° C. for 3 hours. Toluene and unreacted 1-hexene were distilled off to obtain polyhexene. The yield was 4.0 g.

Comparative Example 1

(Preparation of Olefin Polymerization Catalyst and Polymerization of 1-hexene)

In a nitrogen atmosphere, 10 ml of dry toluene (manufactured by Wako Pure Chemical Industries, Ltd.) and 10 ml of 1-hexene (manufactured by Wako Pure Chemical Industries, Ltd.) dried over molecular sieve were added to 12.2 mg (27.5 μmol) of a compound represented by the chemical formula below and synthesized according to J. Org. Chem. p. 5558, vol. 53(23), 1988 and 15.1 mg (55 μmol) of bis(cyclooctadiene)nickel (manufactured by Kanto Chemical Co., Ltd.), followed by polymerization at 60° C. for 3 hours. Toluene and unreacted 1-hexene were distilled off to obtain polyhexene. The yield was 3.4 g.

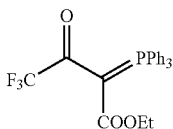

[Chem. 19]

(wherein Ph represents a phenyl group).

It is found that the olefin polymerization catalyst of Example 1 exhibits a high yield and high activity, as compared with Comparative Example 1.

Example 2

(Preparation of Olefin Polymerization Catalyst and Polymerization of Ethylene)

In an argon atmosphere, 10 ml of toluene dried over sodium/benzophenone and ethylene (manufactured by Sumitomo Seika Chemicals Co., Ltd.) purified with a deoxidizer and a dehydrator (Gas Clean and Dry Column both manufactured by Nikka Seiko Co., Ltd.) were added to 14.8 mg (27.5 µmol) of the compound synthesized in Synthesis Example 1 and 15.1 mg (55 µmol) of bis(cyclooctadiene)nickel (manufactured by Kanto Chemical Co., Ltd.) at atmospheric pressure after the pressure in the system was reduced, followed by polymerization at 70° C. for 1 hour. Toluene was distilled off to obtain polyethylene. The yield was 0.41 g. As a result of molecular weight measurement by high-temperature GPC (orthodichlorobenzene, 145° C., RI detection, in terms of PS), Mw was 11,100, and Mn was 3,300.

Comparative Example 2

(In-situ Preparation of Olefin Polymerization Catalyst and Polymerization of Ethylene)

In an argon atmosphere, 10 ml of toluene dried over sodium/benzophenone and ethylene (manufactured by Sumitomo Seika Chemicals Co., Ltd.) purified with a deoxidizer and a dehydrator (Gas Clean and Dry Column both manufactured by Nikka Seiko Co., Ltd.) were added to 12.2 mg (27.5 µmol) of a compound represented by the chemical formula below and synthesized according to J. Org. Chem. p. 5558, vol. 53(23), 1988 and 15.1 mg (55 µmol) of bis(cyclooctadiene)nickel (manufactured by Kanto Chemical Co., Ltd.) at atmospheric pressure after the pressure in the system was reduced, followed by polymerization at 70° C. for 1 hour. Toluene was distilled off to obtain polyethylene. The yield was 0.34 g. As a result of molecular weight measurement by high-temperature GPC (orthodichlorobenzene, 145° C., RI detection, in terms of PS), Mw was 3,600, and Mn was 1,000.

[Chem. 20]

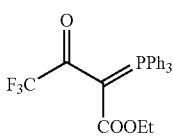

(wherein Ph represents a phenyl group).

It is found that the polyethylene prepared using the olefin polymerization catalyst of Example 2 exhibits a high yield, high activity, and a high molecular weight, as compared with Comparative Example 2.

Example 3

(Preparation of Olefin Polymerization Catalyst and Polymerization of Ethylene)

A 100 ml stainless steel autoclave was used as a polymerization vessel. In a nitrogen atmosphere, 10 ml of toluene dried over calcium hydride and ethylene (manufactured by Sumitomo Seika Chemicals Co., Ltd.) purified with a deoxidizer and a dehydrator (Gas Clean and Dry Column both manufactured by Nikka Seiko Co., Ltd.) were added to 14.8 mg (27.5 µmol) of the compound synthesized in Synthesis Example 1 and 15.1 mg (55 µmol) of bis(cyclooctadiene)nickel (manufactured by Kanto Chemical Co., Ltd.) at 0.45 MPa, followed by polymerization at 70° C. for 15 minutes. As a result, the system was solidified. Toluene was distilled off to obtain polyethylene. The yield was 4.1 g.

Example 4

(Preparation of Olefin Polymerization Catalyst and Polymerization of Ethylene)

In a nitrogen atmosphere, 4 ml of dehydrated toluene (manufactured by Wako Pure Chemical Industries, Ltd.) and 1 ml of dehydrated methanol (manufactured by Wako Pure Chemical Industries, Ltd.) were added to 13.1 mg (50 µmol) of triphenylphosphine (manufactured by Wako Pure Chemical Industries, Ltd.) and 7.2 mg (50 µmol) of 2,6-difluoro-1,4-benzoquinone (synthesized according to J. Chem. Soc. Perkin Trans. p. 2719, vol. 1, 2002), followed by stirring at room temperature for 20 minutes. The resultant solution was concentrated, and then 10 ml of dehydrated toluene was added to the residue. The solution was added to 15.1 mg (55 µmol) of bis(cyclooctadiene)nickel (manufactured by Kanto Chemical Co., Ltd.). Furthermore, the resultant solution was charged in a 100 ml stainless steel autoclave, and ethylene (manufactured by Sumitomo Seika Chemicals Co., Ltd.) purified with a deoxidizer and a dehydrator (Gas Clean and Dry Column both manufactured by Nikka Seiko Co., Ltd.) was added at 0.45 MPa, followed by polymerization at 70° C. for 3 hours. The yield was 0.4 g.

Comparative Example 3

(In-situ Preparation of Olefin Polymerization Catalyst and Polymerization of Ethylene)

In a nitrogen atmosphere, 4 ml of dehydrated toluene (manufactured by Wako Pure Chemical Industries, Ltd.) and 1 ml of dehydrated methanol (manufactured by Wako Pure Chemical Industries, Ltd.) were added to 13.1 mg (50 µmol) of triphenylphosphine (manufactured by Wako Pure Chemical Industries, Ltd.) and 8.9 mg (50 µmol) of 2,6-dichloro-1,4-benzoquinone (manufactured by Wako Pure Chemical Industries, Ltd.), followed by stirring at room temperature for 20 minutes. The resultant solution was concentrated, and then 10 ml of dehydrated toluene was added to the residue. The solution was added to 15.1 mg (55 µmol) of bis (cyclooctadiene)nickel (manufactured by Kanto Chemical Co., Ltd.). Furthermore, the resultant solution was charged in a 100 ml stainless steel autoclave, and ethylene (manufactured by Sumitomo Seika Chemicals Co., Ltd.) purified with a deoxidizer and a dehydrator (Gas Clean and Dry Column both manufactured by Nikka Seiko Co., Ltd.) was added at 0.45 MPa, followed by polymerization at 70° C. for 3 hours. The yield was 0.01 g.

It is found that the polyethylene prepared with the olefin polymerization catalyst in Example 4 exhibits higher yield and activity than in Comparative Example 3.

The invention claimed is:

1. An olefin polymerization catalyst represented by general formula (1), (2), or (3):

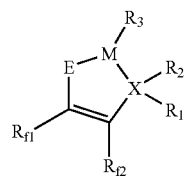
(1)

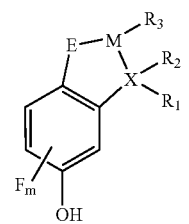
(2)

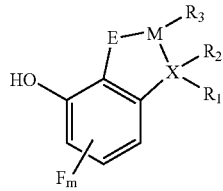
(3)

wherein M is nickel, palladium, or platinum; E is oxygen or sulfur; X is phosphorus, arsenic, or antimony; $R_1$, $R_2$, and $R_3$ are each independently hydrogen or a hydrocarbon group having 1 to 20 carbon atoms; $R_{f1}$ and $R_{f2}$ are each independently a fluorine atom or a fluorohydrocarbon group having 1 to 20 carbon atoms; F is fluorine; and m is 1 to 3.

2. The olefin polymerization catalyst according to claim 1, wherein M is nickel.

3. The olefin polymerization catalyst according to claim 1, wherein E is oxygen, and X is phosphorus.

4. The olefin polymerization catalyst according to claim 1, wherein $R_{f1}$ and $R_{f2}$ are each a fluorohydrocarbon group having 1 to 20 carbon atoms.

5. The olefin polymerization catalyst according to claim 4, wherein $R_{f1}$ is a trifluoromethyl group, and $R_{f2}$ is a pentafluorophenyl group.

6. The olefin polymerization catalyst according to claim 1, wherein $R_1$, $R_2$, and $R_3$ are each a phenyl group.

7. The olefin polymerization catalyst according to claim 6, represented by general formula (4):

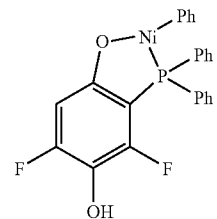
(4)

wherein Ph represents a phenyl group.

8. A method for producing the olefin polymerization catalyst according to claim 1.

9. A method for producing an olefin polymer by polymerizing an olefin in the presence of an olefin polymerization catalyst represented by general formula (1), (2), or (3):

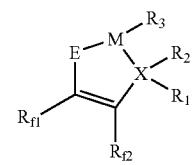
(1)

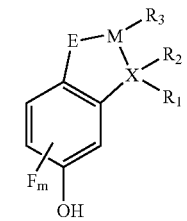
(2)

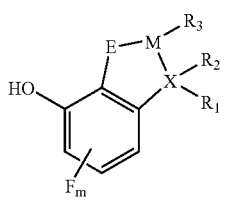
(3)

wherein M is nickel, palladium, or platinum; E is oxygen or sulfur; X is phosphorus, arsenic, or antimony; $R_1$, $R_2$, and $R_3$ are each independently hydrogen or a hydrocarbon group having 1 to 20 carbon atoms; $R_{f1}$ and $R_{f2}$ are each independently a fluorine atom or a fluorohydrocarbon group having 1 to 20 carbon atoms; F is fluorine; and m is 1 to 3.

* * * * *